US007874077B2

(12) United States Patent
Borinato

(10) Patent No.: US 7,874,077 B2
(45) Date of Patent: Jan. 25, 2011

(54) DEVICE FOR DETERMINING THE INCLINATION OF A TOOL, SUCH AS AN ELECTRIC DRILL

(75) Inventor: Gianni Borinato, Vicenza (IT)

(73) Assignee: Positec Power Tools (Suzhou) Co., Ltd., Suzhou, Jiangsu (CN)

( * ) Notice: Subject to any disclaimer, the term of this patent is extended or adjusted under 35 U.S.C. 154(b) by 313 days.

(21) Appl. No.: 11/795,364

(22) PCT Filed: Jan. 13, 2006

(86) PCT No.: PCT/CN2006/000049

§ 371 (c)(1),
(2), (4) Date: Nov. 19, 2008

(87) PCT Pub. No.: WO2006/074609

PCT Pub. Date: Jul. 20, 2006

(65) Prior Publication Data

US 2009/0165313 A1 Jul. 2, 2009

(30) Foreign Application Priority Data

Jan. 17, 2005 (CN) ........................ 2005 1 0038170

(51) Int. Cl.
*B23B 49/00* (2006.01)
*G01C 9/14* (2006.01)

(52) U.S. Cl. ............................ 33/263; 33/283; 33/285; 33/334; 33/DIG. 21

(58) Field of Classification Search ................... 33/263, 33/281, 282, 283, 285, 334, 391, DIG. 21
See application file for complete search history.

(56) References Cited

U.S. PATENT DOCUMENTS 4,295,279 A * 10/1981 Sienknecht .................. 33/334

(Continued)

FOREIGN PATENT DOCUMENTS

CN 2576386 10/2003

(Continued)

OTHER PUBLICATIONS

International Search Report in PCT/CN2006/000049 dated Apr. 20, 2006.

*Primary Examiner*—G. Bradley Bennett
(74) *Attorney, Agent, or Firm*—McCracken & Frank LLP

(57) ABSTRACT

The device (12) comprises a laser (14) which is attached to the tool (2). During operation a laser beam (16) is emitted onto an optical lens (20) which is of cylindrical shape. The lens (20) is suspended to swivel freely, e. g. by means of a swivel arm (24) which is operatively connected to the tool (2). Thus, the main axis (28) of the lens (20) is kept vertically by the gravity force when the tool (2) is moved or tilted. The shape of the laser marker (I1 II, III) generated on a workpiece (8) is an indication for the user of the tool (2) concerning an inclination (x, y) of the tool (2).

20 Claims, 6 Drawing Sheets

U.S. PATENT DOCUMENTS

| | | | | |
|---|---|---|---|---|
| 5,481,809 | A * | 1/1996 | Rooney | 33/DIG. 21 |
| 6,751,879 | B1 * | 6/2004 | Pu | 33/DIG. 21 |
| 6,763,599 | B2 * | 7/2004 | Deshevy | 33/391 |
| 6,898,860 | B2 * | 5/2005 | Wu | 33/334 |
| 7,014,675 | B2 | 3/2006 | Nakai et al. | |
| 7,331,113 | B1 * | 2/2008 | Patrick et al. | 33/334 |
| 7,464,478 | B2 * | 12/2008 | Adrian | 33/DIG. 21 |
| 7,650,699 | B2 * | 1/2010 | Yamamoto | 33/334 |
| 2003/0061720 | A1 * | 4/2003 | Waibel | 33/281 |

FOREIGN PATENT DOCUMENTS

| | | |
|---|---|---|
| CN | 2661368 | 12/2004 |
| DE | 44 35 573 | 4/1996 |
| JP | 2000-343309 | 12/2000 |

* cited by examiner

DEVICE FOR DETERMINING THE INCLINATION OF A TOOL, SUCH AS AN ELECTRIC DRILL

FIELD OF THE INVENTION

This invention relates to a device for determining the inclination of a tool, such as an electric drill, from the true horizontal direction.

BACKGROUND OF THE INVENTION

With regard to some tools it is of great importance that the user applies the tool and works with it in a straight horizontal direction. This is true, for instance, for an electric drill. In order to drill properly a hole into a vertically positioned wall, in most cases the drill bit must be contacted with the wall such that the longitudinal axis of the drill bit is located in a horizontal plane. Any deviation or inclination from the true horizontal direction should be discovered and corrected before the drilling process proper starts. For the user of the drill the determination of such inclination without any indication device may be difficult, in particular when the user cannot standright behind the drill or when the user has to reach to the side or overhead.

Consequently, when the user wants to drill a horizontal hole into a vertical wall by means of an electric drill, the user would like to have a clear indication whether or not a vertical deviation from a strictly horizontal direction prevails, in order to provide for a correction, if necessary.

SUMMARY OF THE INVENTION

Thus, it is an object of this invention to provide a device for determining whether or not there is an inclination of a tool with regard to a horizontal plane.

It is another object of this invention to provide a device which gives a clear optical indication to the user of the tool whether or not the tool is applied strictly horizontally with respect to an object or a working piece, such as a vertical wall.

It is still another object of this invention to provide an inclination determining device which is easy to handle.

And it is still another object of the invention to provide such a device, which can be produced at relatively low cost.

According to this invention the device comprises a) a lens being at least essentially of a cylindrical configuration, said lens having a main axis, b) a laser for emitting a laser beam onto said lens, said laser being attachable to said tool, and c) means for associating said lens with said tool in such a way that said main axis of said lens is kept vertically by gravity.

In particular, the aforementioned means comprises a rigid swivel arm, such as a wire. This swivel arm can swivel about a swivel axis which is perpendicular to the central laser beam. Such arm may swivel in a predetermined plane, and it enables the lens to follow the gravity force and to keep its main axis vertically, when the tool and thus the laser beam are tilted or inclined away from the horizontal plane.

The laser beam that leaves the lens is spreaded. It forms a laser marker on the work piece. If the laser is attached to the tool, the marker is an inclined line when the tool is no longer in a strictly horizontal position. This is as opposed to a straight line when the tool is in a strictly horizontal position. The inclined line is a clear indication for the user of a prevailing deviation that should be corrected.

The swivel arm is preferably connected between the lens and a holding arm, which may be L-shaped and which in turn is connected to the tool and/or to the laser. The arm may be arranged on top of the tool.

In order to help the lens to stay in the vertical position and to eliminate a certain sensitivity against vibrations, the lens should be provided with a weight. The weight may be made out of a heavy metal, such as iron or lead. It should be attached to the lower part of the lens.

The aforementioned device may be connected or attached to the tool at any suitable location. The top of the tool was found to be particularly suitable.

The preferred application of the device is an electric power drill. The inclination determining device should be attached to the top surface of the drill.

In order to obtain laser markers of larger curvature (winding) on the work piece in case of an inclination, it is of advantage to use a lens which is not strictly cylindrical, but a lens whose diameter in the middle section is different from that of an end portion.

The laser/lens combination including any desired additional components may be designed as a take-off unit, which can be easily removed from the tool, e. g. by sliding.

A damping system for cancelling unwanted vibrations may be associated with the lens. Such a system may contain silicon oil. It may also contain a tube that is rotatable about pivot plugs inserted into the end portions thereof.

For an easy adjustment of the tool with respect to the horizontal plane, another preferred embodiment is provided with additional components. Such embodiment comprises a) an additional laser for emitting an additional laser beam, said additional laser being attachable to said tool, b) an additional lens being essentially of cylindrical configuration and c) attaching means for attaching said additional lens to said tool or to said additional laser.

In this embodiment, the laser and the additional laser may be firmly attached parallel to each other on the tool. Since the additional laser should be firmly attached to the tool, it will generate a straight laser marker on the work piece, no matter whether there is an inclination or not.

Alternatively, in this embodiment the lens and the laser may be suspended together by means of a swivel arm. In this case, the laser will also generate a straight laser marker on the work piece. If there is an inclination, both laser marker lines will have a gap in between. The tool can be oriented into a straight horizontal position by closing the gap.

The additional components may have features as described already above.

Additional elements which are also of advantage are described in the subclaims.

Subsequently preferred embodiments of the invention will be described with reference to the drawings.

DETAILED DESCRIPTION OF PREFERRED EMBODIMENTS

Figure 1:
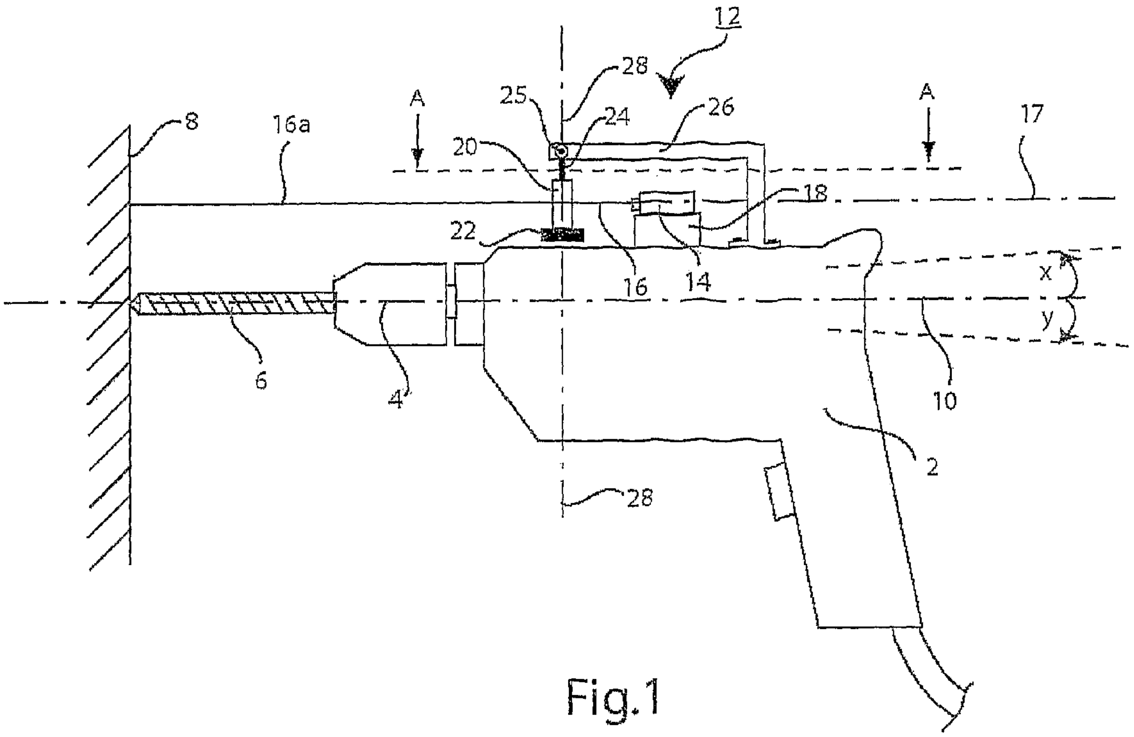
FIG. 1 is a side view of an electric drill having attached to its top a device for determining a deviation in a vertical direction.
Figure 2:
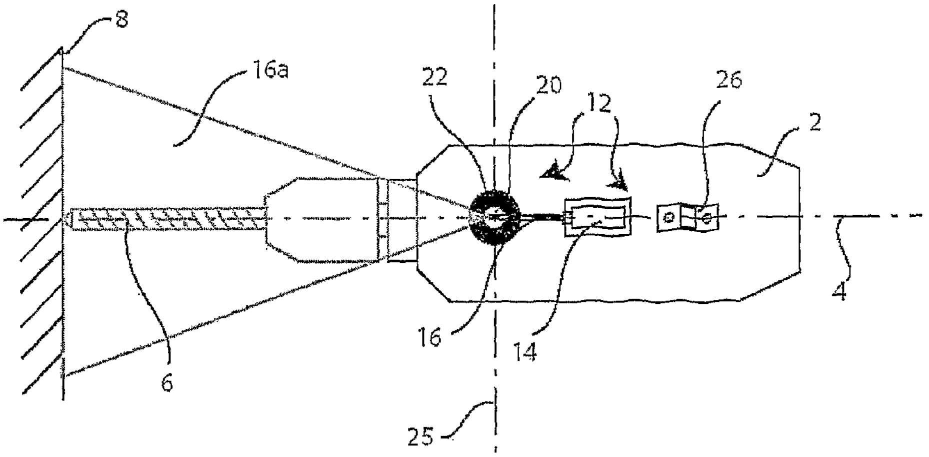
FIG. 2 is a sectional view along the line A-A in FIG. 1.

According to FIGS. 1 and 2, a conventional tool 2, in this case an electrical drill, should be held by a user strictly in a horizontal position in order to perform a proper job. For this purpose the longitudinal axis 4 of the attached drill bit 6 should be positioned exactly perpendicularly with respect to a vertically arranged workpiece 8, such as a wall, in order to bore a hole into the workpiece 8. Any inclination x or y from the true horizontal direction which is depicted as line 10 in FIG. 1 should be detected so that the user of the tool 2 may perform a correction. For this purpose an inclination determining device 12 is located on top of the tool 2 in the middle section thereof.

The tool 2 comprises a laser 14 for emitting a laser beam 16. In FIGS. 1 and 2 the laser beam 16 is shown to propagate along a strictly horizontal line 17 (located in the paper plane). The laser 14 is connected to a base or support 18, which is firmly attached to the upper surface of the tool 2 in the middle section thereof. The attachment is such that the laser beam 16 is parallel to the longitudinal axis 4 of the drill bit 6, when inserted into the drill. The tool 2 also comprises an optical lens 20 of (at least essentially) cylindrical configuration or shape, which lens 20 is positioned at the front section of the tool 2. The lens 20 may be made of a material such as glass or plastic. During operation the lens 20 is illuminated by the laser beam 16. A weight 22, e. g. made of iron or lead, is attached to the lower end of the lens 20. And to the center of the upper end of the lens 20 there is attached a rigid swivel arm 24 which may be a thin wire or any other suitable relatively thin means.

The upper end of the swivel arm 24 is held attached to a swivel axis 25 which is arranged perpendicularly with respect to the laser beam 16. The swivel axis 25 is formed at the end of the longitudinal end portion of an L-shaped holding arm 26. The other end of the arm 26 is firmly attached to the upper surface of the tool 2. Thus, the suspended lens 20 can freely swivel in a plane containing the line 17. In other words: Even if there is an inclination x or y of the tool 2, the cylinder or main axis 28 of the lens 20 is kept vertically by means of the gravity force exercised on the lens 20 and on the weight 22.

The effect of the optical lens 20 is that the beam is spread, as illustrated by the spreaded beam 16*a* in FIG. 2.

There may be provided a compartment, case or housing (not illustrated) for jointly receiving the laser 14, the lens 20 and the arm 26.

Figure 3:
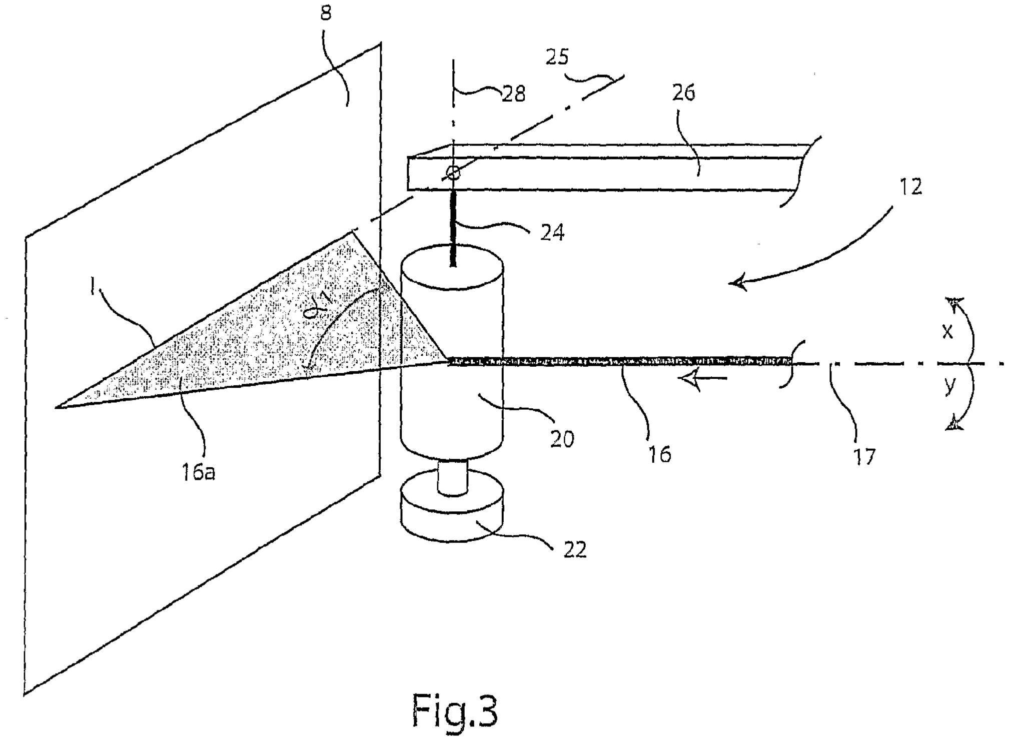
FIG. 3 is an enlarged perspective view of the afore-mentioned device, wherein the tool is in a strictly horizontal position.

In FIG. 3 a portion of the device 12 is shown on an enlarged scale. If there is no Inclination x or y, the spreaded beam 16*a* leaving the lens 20 will generate a laser marker I which is a straight line on the work piece 8

Figure 5:
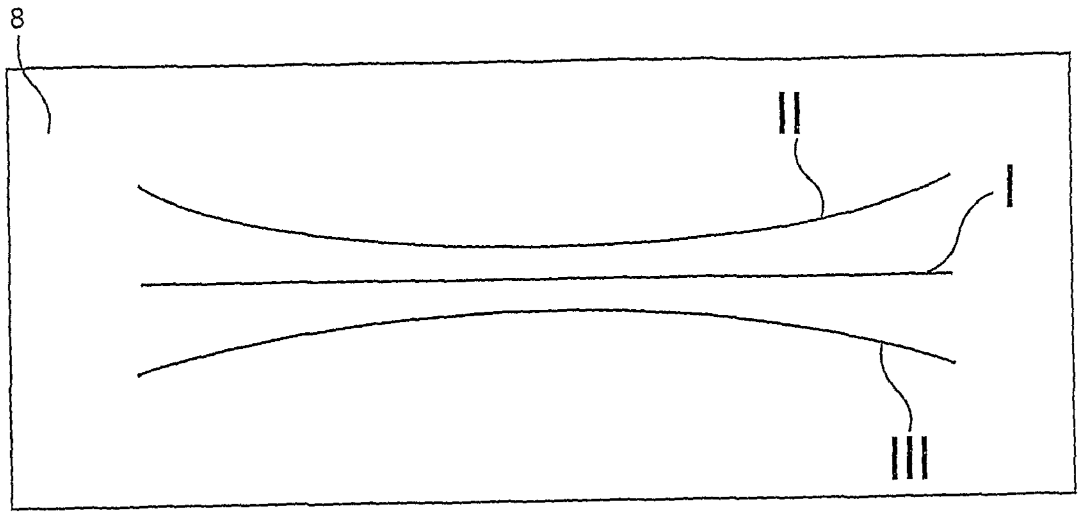
FIG. 5 is an illustration of three laser markers I, II and III formed on a working piece, such as a wall.
Figure 6:
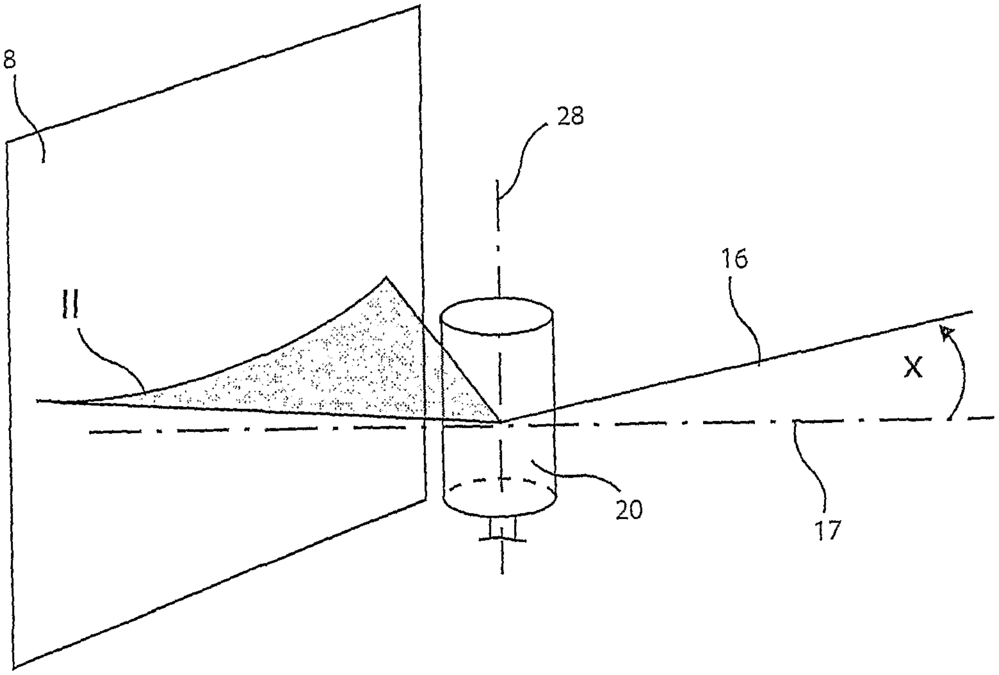
FIG. 6 is a perspective view similar to that of FIG. 3.

FIG. 5 illustrates a front view of the work piece 8. As just mentioned, the straight line I is obtained when the tool 2 and therefore the laser beam 16 is at an exact vertical position, i. e. when x=y=0. In this case, the laser beam 16 is located on the true horizontal line 17. When, however, an inclination x, that is a movement or tilting "down to up" of the tool 2 and therefore of the laser beam 16, has occurred, the laser marker will assume the configuration of the curved line II. This is also shown in the perspective view of FIG. 6. Correspondingly, when an inclination y has occurred, that is a movement of the laser beam 16 "up to down", the laser marker will assume the configuration of the curved line III. Line III is bent in opposite direction as compared with line II. Therefore, the user of the tool 2 knows whether he or she is working in the right direction, and—if necessary—the user can perform a correction of the direction in order to obtain line I.

Figure 4:
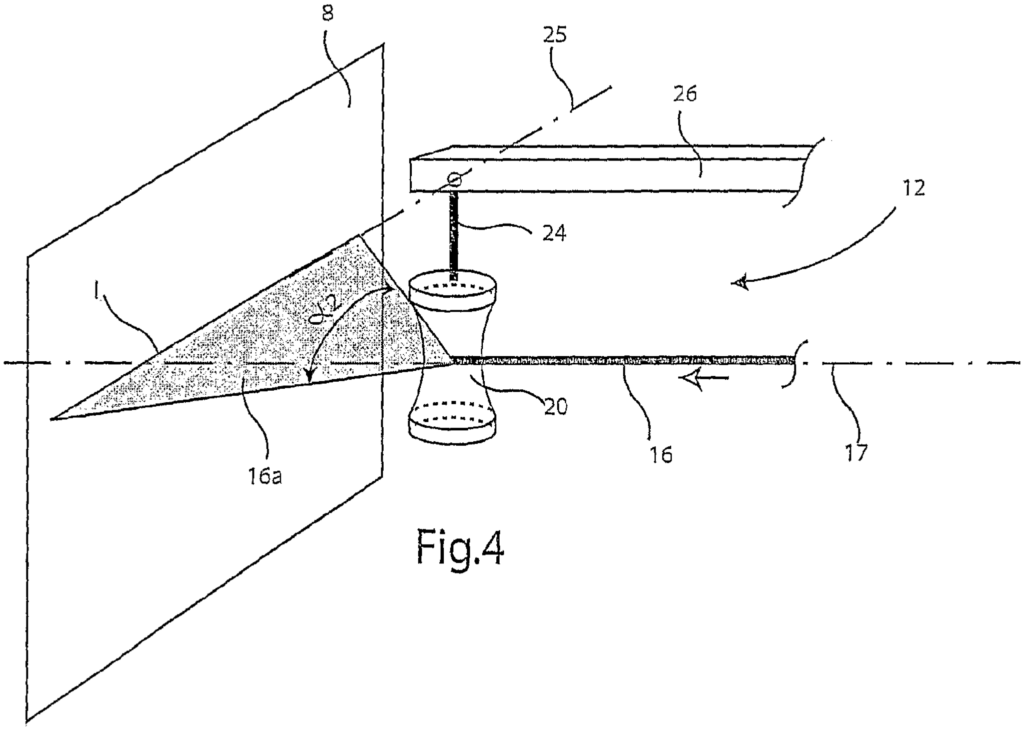
FIG. 4 is another embodiment of a lens which can be used in the device.

FIG. 4 illustrates a lens 20 which is not of strictly cylindrical configuration, as in FIG. 3. This lens 20 has a first diameter at its central portion and a second diameter at both end portions. The first diameter is smaller than the second diameter. Such a shape provides for stronger or more intensively curved lines II and III than a strictly cylindrical shape of the lens 20. Therefore, it is easier for the user to realize and to determine the degree of deviation x and y, respectively.

Figure 7:
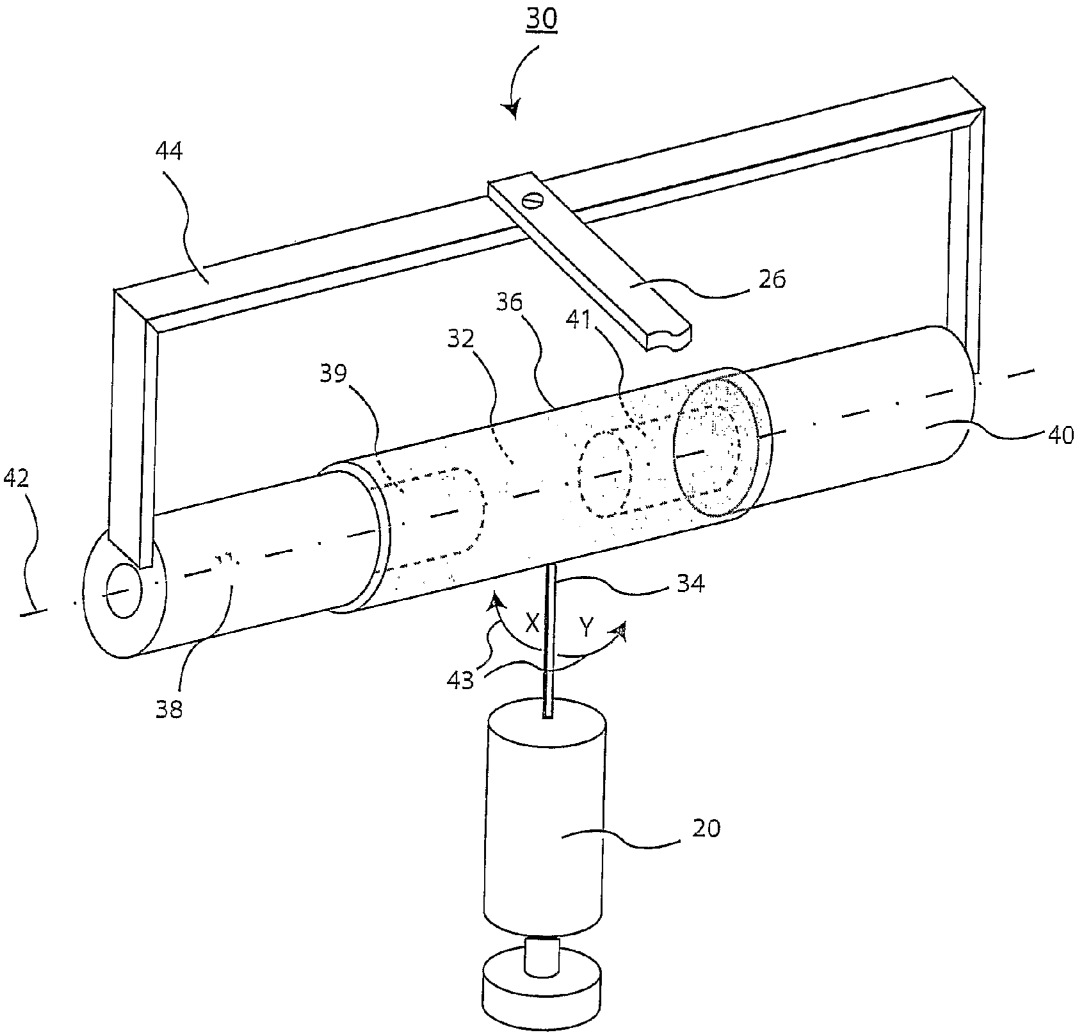
FIG. 7 is a device having associated a damping system for damping unwanted movements of the lens.

In FIG. 7 a damping system for damping oscillations of the lens 20 is shown. The lens 20 is suspended from an arm 26 which is fixed to the tool 2 by means of a U-shaped frame 44. This damping system 30 contains silicon oil 32 inside. In particular: The lens 20 is suspended by means of a rigid connection or thin connection thread 34 the upper end of which is connected to the central portion of a tube 36 containing the silicon oil 32. The lower end of the thin connection thread 34 is connected to the center of the upper end of the cylindrical lens 20. On both its sides the tube 36 is held by tubular end pieces 38, 40, which are aligned on the very same axis 42 and which extend rotatably into the ends of the tube 36. For this purpose pivot plugs 39, 41 are provided which are shown in dashed lines. The outer ends of the tubular end pieces 38, 40 are attached to the U-shaped frame 44. Thus, the assembly 20, 34, 36 can jointly swivel around the axis 42, which is indicated by a double-arrow 43, if an inclination x or y occurs. The middle portion of the frame 44 is attached to the arm 26.

The silicon oil 32 works as a low pass filter. It absorbs and damps all vibrations having a frequency above about 2 Hz. Due to the force of gravity, the lens 20 can slowly move to a vertical position again when an inclination x or y occurs. The negative effect of vibrations coming from the motor of the drill and from the drill bit 6 is eliminated.

Figure 8:
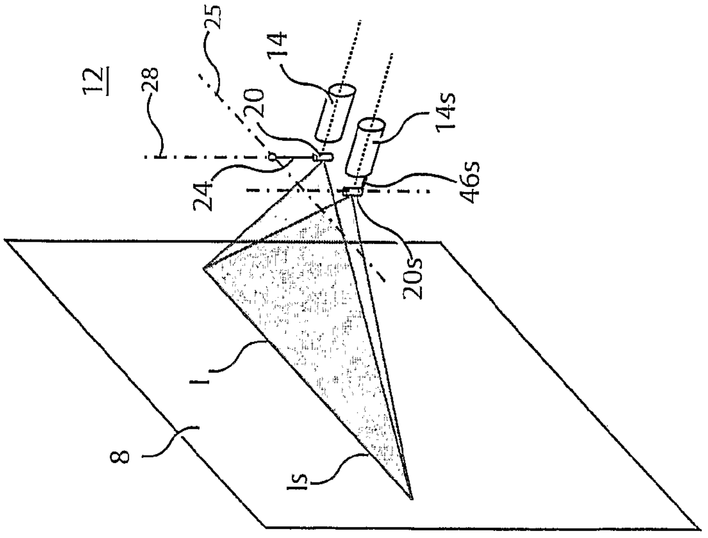
FIG. 8 is a first supplemented device having two lasers and two lenses for producing two laser markers, wherein the drill is in a strictly horizontal position.
Figure 9:
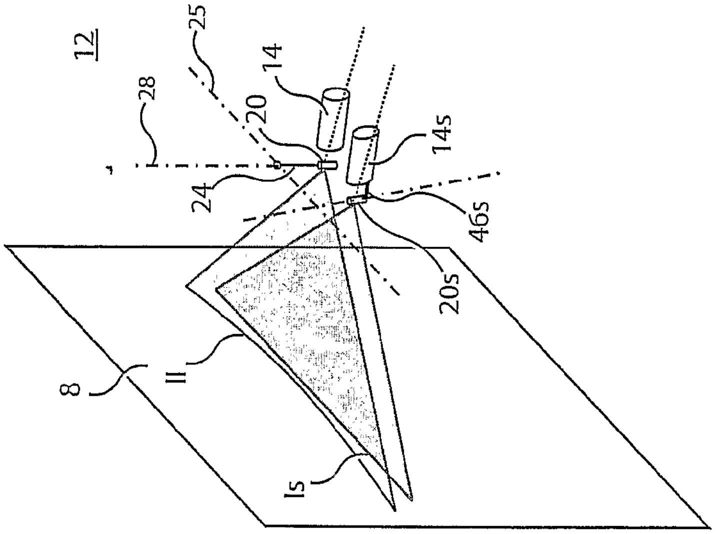
FIG. 9 is the device of FIG. 8, wherein the drill has experienced a deviation x.
Figure 10:
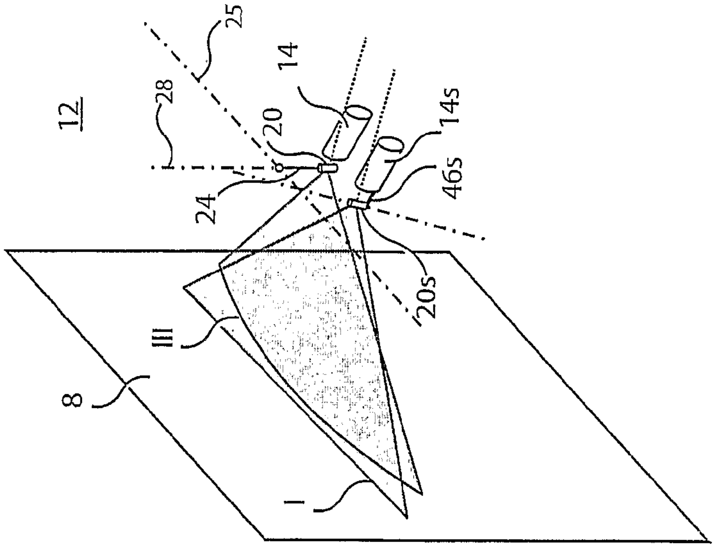
FIG. 10 is the device of FIG. 8, wherein the drill has experienced a deviation y in the opposite direction.

It should be noted that the device 12 may be supplemented with an additional laser 14*s* and an additional cylindrical lens 20*s*. Such a supplemented device 12 is illustrated in FIGS. 8 to 10.

The two lasers 14, 14*s* should be arranged close and parallel to each other. Both of them should be firmly attached on the tool 2 during operation. If needed, they may be releasably connected to the tool 2. Each laser 14, 14*s* has its own cylindrical lens 20 and 20*s*, respectively, which will be illuminated by the corresponding laser beam. The additional lens 20*s* is fixed to the additional laser 14*s*, e. g. by a connection arm 46*s*. Alternatively, it may also be fixed to the first laser 14 or directly to the tool 2. In other words, the entire assembly 20*s*, 46*s* and 14*s* is attached to the tool 2. No swivel arm is used for suspension of the additional lens 20*s*. Therefore, the additional lens 20*s* moves together with the additional laser 14*s* and with the tool 2, if an inclination x or y occurs. Thus, the laser beam coming from the additional laser 14*s* impinges on the additional lens 20*s* always perpendicularly with regard to its main lens axis.

The first lens 20 is suspended in the same way as in one of the previous embodiments, e. g. by means of a rigid swivel arm 24. It is therefore freely rotatable around the axis 25, along with the arm 24, and it moves in a vertical direction x, y under the force of gravity so that its main axis 28 will maintain its strictly vertical position.

When the tool 2 is perfectly oriented horizontally, the two laser markers I, Is coming from the two lenses 20 and 20*s*, respectively, are both straight. They are on the same line. In other words: The user can only see one straight line. This is depicted in FIG. 8.

However, if the tool 2 has been moved up or down (tilting direction x or y), the user will see two lines Is and II or Is and III as follows: The first line Is derived from the additional laser 14*s* and the additional lens 20*s* has remained straight (see line Is in FIGS. 9 and 10), because the additional lens 20*s* is fixed to the additional laser 20*s* and/or to the tool 2. The second line (coming from the first laser 14 and the first lens 20) becomes curved. Depending on the direction of inclination x or y, the second line will now assume the configuration of the line II (as depicted in FIG. 9) or of the line III (as depicted in FIG. 10). The second line II, III is now separated from the first line Is. In this way, such separation is already an indication for the presence of an inclination. Thus, it is easy for the user to adjust the tool 2 to a perfect horizontal position. All the user has to do is to move the tool 2 up or down until the separation disappears and the two lines Is and II or the lines Is and III overlap. Now the user will see just one line, as depicted in FIG. 8.

Figure 11:
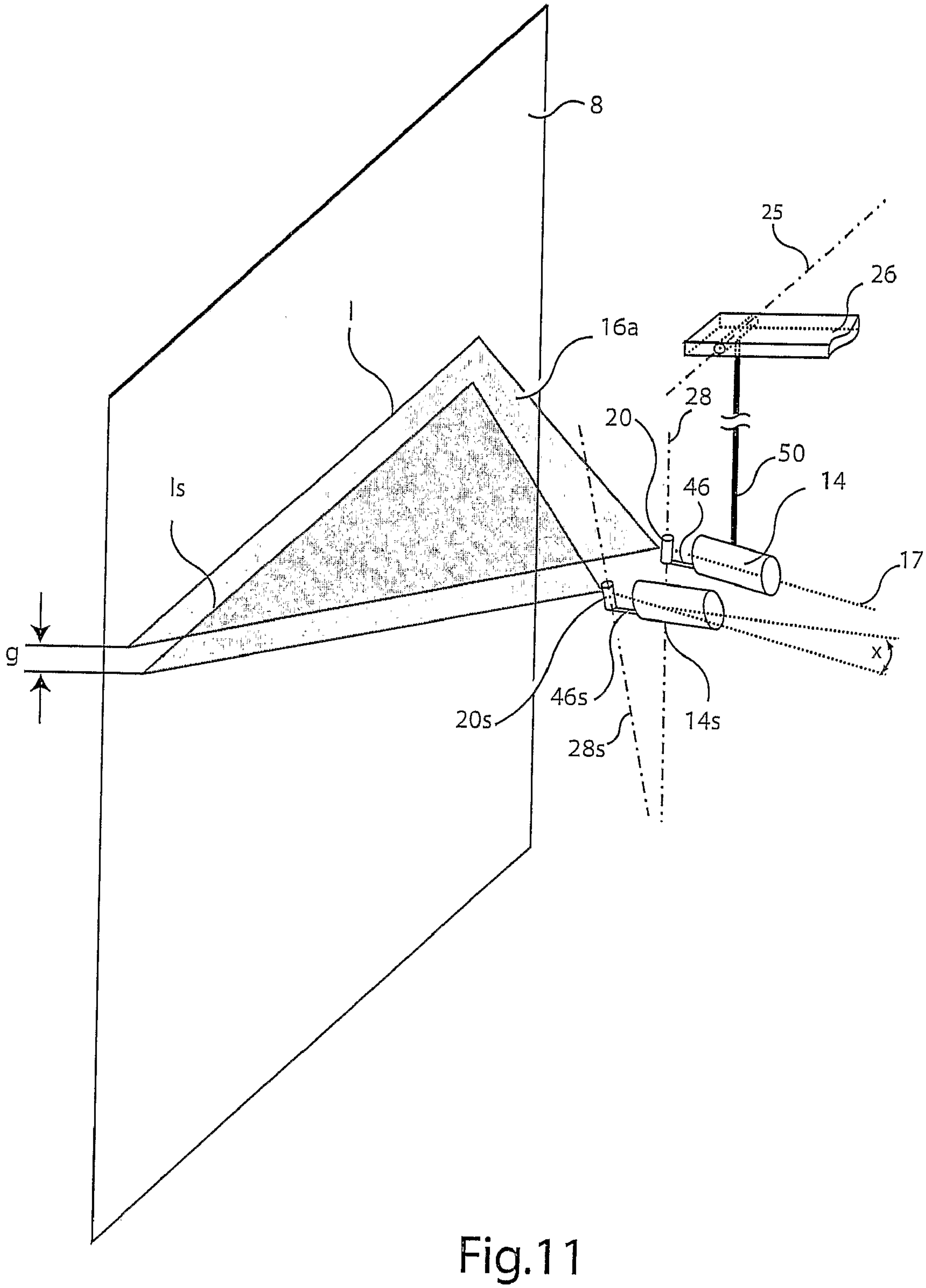
FIG. 11 is a second supplemented device having two lenses and two lasers for producing straight line laser markers, wherein the drill has experienced a deviation x from the horizontal position, as in FIG. 9.

In FIG. 11 another supplemented device 12 is illustrated. This device 12 is similar to the device 12 in FIGS. 8 to 10, yet it provides not a straight and a curved laser marker, but two straight laser markers I an Is, which are arranged in a distance g, on the work piece 8, if there is an inclination x or y. In FIG. 11 the x position is illustrated.

According to FIG. 11, there is a first assembly comprising the laser 14, the lens 20 and an attaching means, in particular a connection arm 46 in between. It must be noted that the laser 14 is not directly attached or connected to the tool 2. The entire first assembly 14, 20, 46 is suspended by means of a rigid swivel arm 50 from an L-shaped arm 26, which in turn is connected to the tool 2. By this arrangement, the entire first assembly 14, 20, 46, 50 is freely tiltable about the axis 25 so that the main axis 28 of the lens 20 will remain in a vertical position and the laser beam on a true horizontal line 17 because of the force of gravity, no matter whether there is an inclination x, y or not.

There is also a second assembly, which comprises the additional laser 14*s*, the additional lens 20*s* and the additional connection arm 46*s* in between. Here it must be noted that the additional laser 14*s* is directly attached or connected to the tool 2. Therefore, the entire second assembly 14*s*, 20*s*, 46*s* moves together with the tool 2. Thus, the main axis 28*s* of the additional lens 20*s* is tilted, as shown, when an inclination x occurs.

From the laser beams of both lasers 14, 14*s* laser markers I and Is, respectively, are formed on the work piece 8. Both laser markers I, are straight lines. The laser marker I may be considered as the reference line.

When the tool 2 is in a strictly horizontal position, i. e. when the main axes 28, 28*s* are positioned vertically, both laser markers I, Is will be at the same level (g=0), that is they will overlap. But as soon as the tool 2 is no longer in a horizontal position, the two lines I, Is will no longer overlap. The line I coming from the first laser assembly 20, 46, 14 will remain horizontal, because the force of gravity will keep the lens axis 28 in a vertical position. However, the line Is coming from the second laser assembly 20*s*, 46*s*, 14*s* will follow the tool's inclination. Now, two different lines I, Is can be seen on the vertical wall 8. The gap or distance g between these lines or markers I, Is is correlated to the degree of inclination x, y. It is now very simple to adjust the tool 2 to a horizontal position. All that has to be done by the user is to make the two lines I, Is overlap.

The device 12 described above is easy to handle, and it can be produced at relatively low cost.

LIST OF REFERENCE NUMERALS

2 tool
4 longitudinal axis
6 drill bit
8 workpiece
10 horizontal line
12 inclination determining device
14 laser
14*s* additional laser
16 laser beam
16*a* spreaded beam
17 true horizontal line
18 support
20 optical lens
20*s* additional optical tens
22 weight
24 swivel arm
25 swivel axis
26 holding arm
28 main axis
30 damping system
32 silicon oil
34 thin connection thread
36 tube
38 tubular end piece
39 pivot plug
40 tubular end piece
41 pivot plug
42 axis
43 double-arrow
44 frame
46 connection arm
46*s* additional connection arm
50 swivel arm
I, Is straight laser marker lines
II curved line
III curved line
G gap, distance
x inclination
y inclination

The invention claimed is:

1. A device for determining the inclination of a tool from the true horizontal direction, comprising a) a lens being at least essentially of a cylindrical configuration, said lens having a main axis, b) a laser for emitting a laser beam onto said lens, said laser being attachable to said tool, and c) means for associating said lens with said tool in such a way that said main axis of said lens is kept vertically by gravity.

2. The device according to claim 1, wherein said associating means comprises a swivel arm.

3. The device according to claim 2, wherein said swivel arm is connected to a holding arm, and wherein said holding arm is connected to said tool.

4. The device according to claim 3, wherein said arm is arranged above said tool when said tool is held in a working position and points in a horizontal direction.

5. The device according to claim 1, wherein a weight is attached to said lens.

6. The device according to claim 1, wherein said device is firmly connected to said tool.

7. The device according to claim 1, further comprising a housing for receiving said laser and said lens.

8. The device according to claim 1, wherein said laser is connected to a base which is attached to said tool.

9. The device according to claim 1, wherein said tool is a drill.

10. The device according to claim 1, wherein the material of said lens is a glass or a plastic material.

11. The device according to claim 1, wherein the diameter of said lens is approximately equal to the width of said laser beam.

12. The device according to claim 11, wherein the diameter of said lens is in the region of 1 to 2 mm.

13. The device according to claim 1, wherein said lens has a first diameter in its central portion and a second diameter in at least one of its end portions, and wherein said first diameter is different from said second diameter.

14. The device according to claim 1, wherein a damping system is associated with said lens.

15. The device according to claim 1, wherein a thread is directly connected to said lens.

16. The device according to claim 1, further comprising a) an additional laser for emitting an additional laser beam, said additional laser being attachable to said tool, b) an additional lens being essentially of cylindrical configuration and c) attaching means for attaching said additional lens to said tool or to said additional laser.

17. The device according to claim 16, wherein said attaching means is a connecting arm.

18. The device according to claim 16, wherein said laser and said additional laser are attached in parallel to each other on said tool.

19. The device according to claim 16, wherein a connecting arm is provided for connecting said lens to said laser, wherein said lens, said laser and said connecting arm form an assembly, and wherein a swivel arm is connected to said assembly.

20. The device according to claim 1, wherein said device is firmly connected to a top of said tool.

* * * * *